United States Patent [19]

Boggs

[11] 3,760,021

[45] Sept. 18, 1973

[54] ALKYLATION CATALYST

[75] Inventor: Jesse K. Boggs, Seabrook, Tex.

[73] Assignee: Esso Research and Engineering Company, Linden, N.J.

[22] Filed: Aug. 13, 1971

[21] Appl. No.: 171,733

[52] U.S. Cl. ......... 260/671 P, 252/429 R, 252/442, 260/671 B, 260/671 C
[51] Int. Cl. ............................................. C07c 5/28
[58] Field of Search .................... 260/671 C, 671 P, 260/671 B; 252/429 R, 442

[56] References Cited
UNITED STATES PATENTS
3,649,698  3/1972  Schmerling .......................... 252/442
3,651,159  3/1972  Long et al. ........................... 252/442
3,655,797  4/1972  Schmerling ...................... 260/671 C Primary Examiner—Curtis R. Davis
Attorney—Thomas B. McCulloch et al.

[57] ABSTRACT

A homogeneous catalyst system useful in selectively tertiary alkylating aromatic hydrocarbons consists essentially of the complex resulting from the reaction of aluminum chloride and cuprous chloride in a molar excess of aromatic hydrocarbon solvent, wherein the molar ratio of $AlCl_3$ to CuCl is within the range of about 0.4 to about 0.5.

The complex may be formed by admixing the constituents at room temperature and allowing the admixture to stand under an inert atmosphere for an extended period, or the constituents may be refluxed under substantially atmospheric pressure for a shorter time period in order to form the complex.

The homogeneous catalyst may be used under calculated conditions which are generally known to those skilled in the art. The use of a tertiary (Type III) olefin as the alkylating agent permits alkylation conditions which employ higher temperatures and pressures than can be used if a tertiary alkyl chloride is employed as the alkylating agent.

11 Claims, No Drawings

ALKYLATION CATALYST

REFERENCE TO COPENDING APPLICATION

This application is related to U. S. Ser. No. 101,921 entitled Selective Tertiary Alkylation of Aromatic Hydrocarbons, filed by the present inventor on Dec. 28, 1970.

DESCRIPTION OF THE INVENTION

The present invention is directed to a catalyst system for use in the selective tertiary alkylation of aromatic hydrocarbons. As pointed out in copending application Ser. No. 101,921, it is desirable to provide a system for alkylating aromatic hydrocarbons with tertiary alkyl substituents so as to obtain highly stable tertiary alkyl aromatic hydrocarbons which can be used as synthetic lubricants and greases. It has long been well known that a tertiary alkyl substituent, which does not possess a benzylic hydrogen atom, is much more stable than the normal or secondary alkyl substituents which do possess such labile hydrogen atoms. In the process of the copending application, selective alkylation is obtained by use of rigorously controlled operating conditions, while using the well-known Friedel Crafts catalysts. By contrast, when using tertiary (Type III) olefins as the alkylating agent, the catalyst system of the present invention allows alkylation under less rigorously controlled operating conditions. Even when utilizing tertiary alkyl chlorides as alkylating agents, however, the present catalyst provides a suitable system for carrying out the selective reaction which is desired.

The present invention utilizes as a catalyst system the complex which is formed between an aromatic hydrocarbon (such as benzene), aluminum chloride, and cuprous chloride. The complex is formed by reaction of the $AlCl_3$ and $CuCl$ constituents in a great molar excess of the aromatic hydrocarbon. Preferably, the aromatic hydrocarbon utilized in forming the complex will be the same aromatic hydrocarbon which later is to be subjected to tertiary alkylation. In this manner, it is quite easy to charge a reactor with the aromatic hydrocarbon which is to be tertiary alkylated, add the catalyst constituents in the proper mole ratio, form the catalyst in situ, and then introduce the alkylating agent into the reaction zone. In this way, the aromatic hydrocarbon which is already present will then be tertiary alkylated without additional handling.

As used in the present specification, the term "Type III olefins" refers to those olefins which, upon reaction with hydrogen chloride, form tertiary alkyl chlorides. Further, in the present specification, aluminum chloride is referred to as represented by molar formula $AlCl_3$, and cuprous chloride as represented by the molar formula $CuCl$. All of the molar proportions are based upon the compounds as expressed in the above-mentioned molar formulas.

THE CATALYST

The present invention relates to the complex formed by reaction of aluminum chloride, cuprous chloride and an aromatic hydrocarbon. It has been found that the molar ratio of aluminum chloride to cuprous chloride must be maintained within a fairly narrow range; that is, from 0.4 to 0.5. The aromatic hydrocarbon in which the complex is to be formed is utilized in a great molar excess; that is, from 10 to 15 moles of aromatic hydrocarbon will be employed for each mole of cuprous chloride.

The aromatic hydrocarbons employed in the formation of the catalyst will most suitably be the aromatic hydrocarbon which is to be tertiary alkylated. This would include benzene, t-butyl benzene, naphthalene, t-butyl naphthalene, and $C_4$ to $C_{20}$ t-alkyl benzenes. Many of the suitable aromatic hydrocarbons will be solid under ambient conditions, or under the conditions to be utilized in manufacturing the catalyst or carrying out the tertiary alkylation. Therefore, an inert solvent may be employed along with the heavier hydrocarbons. The amount of solvent to be employed is suitably determined by experiment, and suitable solvents are described in my copending application, Ser. No. 101,921.

Inert solvents such as heptane and cyclohexanes are suggested as suitable.

It is also possible to utilize benzene as the aromatic hydrocarbon in preparing the homogeneous catalyst of the present invention, and then adding the thus obtained complex to the reaction zone wherein a different aromatic hydrocarbon is to be employed as the aromatic nucleus for the tertiary alkylation reaction.

The complex product which is obtained by the present invention when benzene is employed is a liquid compound which is soluble in aromatic solvents and will therefore provide a homogeneous catalyst system in the tertiary alkylation of aromatic hydrocarbons.

PREPARATION OF CATALYSTS

The catalyst system of the present invention can be prepared in at least two ways. In both instances, however, molecular oxygen (e.g. air) must be rigorously excluded during the formation of the complex and during any subsequent alkylation reaction. One procedure for preparing the homogeneous catalyst of the present invention comprises admixing one molar part of $AlCl_3$ with sufficient CuCl to obtain an $AlCl_3/CuCl$ molar ratio within the range of from about 0.4 to about 0.5 (a ratio of about 0.5 is preferred). A molar excess (e.g. from 10 to 15 mols per mol of CuCl) of an aromatic hydrocarbon, suitably chosen, is also admixed with the $AlCl_3$ and CuCl. The admixture may be formed suitably in a dry box, under an inert atmosphere, and allowed to stand without external heating (although the mixture may be externally cooled) for a period of two hours to three days, preferably from about 8 to about 24 hours. As will be seen in the examples, a time period of about 16 hours has proven to be satisfactory. After the formation of the complex by this procedure, it can be removed from the dry box and utilized as a homogeneous catalyst. Data seem to indicate that catalyst formed by this procedure is preferable to catalyst formed by refluxing according to the procedure next discussed.

A suitable catalyst, although less desirable than the catalyst obtained by the procedure above set forth, can be prepared by first forming an admixture of the constituents as above noted, and then refluxing the constituents for a time period from about 5 minutes to about 3 hours at substantially atmospheric pressure. Preferably, the time period will be from about 30 minutes to about 1 hour. The complex thus formed can be utilized hot in the alkylation of an aromatic hydrocarbon utilizing a Type III olefin as the alkylating agent, or it may be cooled and then used as the catalyst system for tertiary alkylating aromatic hydrocarbons with t-alkyl chlorides as the alkylating agent, all as is described hereinafter. Where heavier aromatic hydrocarbons are to be employed, the use of cosolvents in the refluxing zone may also be desirable, so as to maintain the temperature of refluxing at reasonably low levels, similar to the boiling point of benzene.

As will be seen from the examples hereinafter given, the soluble, homogeneous catalyst complex which is formed upon standing several hours at ambient temperature is more effective in the selective tertiary alkylation reaction than is the complex which is formed quickly by refluxing. Therefore, it is preferred to allow the complex to stand for the above-mentioned period of time before it is used as a catalyst system in the alkylation reaction.

It is also seen, by the examples hereinafter given, that Friedel Crafts catalysts which have much less activity then the present catalyst cannot be intermixed with the catalyst system without suffering deleterious effects. Example 6 particularly points out the fact that $FeCl_3$ may be deleterious to the system.

THE ALKYLATION REACTION

The process of using the novel catalyst system of the present invention in tertiary alkylation reactions is basically the same as the process utilized with other Friedel Crafts catalysts. However, it has been found that, when using a Type III olefin as the alkylating agent, the present catalyst system allows a wider range of temperatures and pressures than previously obtainable, while maintaining the selective tertiary alkylation of aromatic hydrocarbon. When using tertiary alkyl chlorides as the alkylating agents, lower temperatures and pressures are preferably employed.

Aromatic hydrocarbon feedstocks which are suitable for tertiary alkylation according to the present invention will be found in benzene, t-butyl benzene, naphthalene, t-butyl naphthalene, and the $C_4$ to $C_{20}$ t-alkyl benzenes. Heavier hydrocarbons in the above group may require the use of an inert solvent such as heptane or cyclohexanes, so as to provide the liquid medium which is required.

Type III olefins which may be employed as alkylating agents will be found in $C_7$ to $C_{44}$ compounds, preferably (for the production of lubricant stock) the compounds which contain from 12 to 32 carbon atoms.

Tertiary alkyl chloride can also be employed as the alkylating agent, and will also suitably contain from 7 to 44 carbon atoms, preferably 12 to 32 carbon atoms.

The operating conditions will depend upon the alkylating agent. Where Type III olefins are employed as the alkylating agent, a temperature from about 160° to about 200° F., preferably 175° to 190° F., will be employed, along with substantially atmospheric pressure (preferably from 14.5 to about 15.0 psia) and an olefin residence time from about 5 minutes to about 2 hours (preferably 15 to 45 minutes). The olefin to catalyst mole ratio will range from about 3 to about 15, preferably about 10 based on $AlCl_3 \cdot CuCl)_2$, as constituting one mole of catalyst in the formed complex. For continuous operation, the ratio will be obtained by monitoring the amount of olefin and the amount of complex introduced into the continuous reaction zone. For batch operations, the amount of olefin added will be monitored, and compared to the amount of catalyst originally charged into the batch reactor. For semi-continuous operations, a similar comparison will be utilized.

Where a tertiary alkyl chloride is employed as the alkylating agent, conditions similar to those specified in my copending application, Ser. No. 101,921 are suitably employed. These conditions include a temperature range from about −4° F. to about 212° F. (preferably about 32° F. to about 86° F.), a pressure from about 5 mm Hg absolute to about 400 mm Hg absolute (preferably from 15 mm to about 300 mm), a t-alkyl chloride residence time from about 2 minutes to about 8 hours (preferably from about 15 minutes to about 4 hours) and t-alkyl chloride to catalyst mole ratio from about 3 to about 15 ( preferably about 10) based on $AlCl_3 \cdot (CuCl)_2$.

The alkylation reaction is suitably carried out by preparing the catalyst in situ in the aromatic hydrocarbon to be tertiary alkylated, adjusting the temperature and pressure, and then adding the alkylating agent under alkylation conditions.

In order to illustrate the present invention, a series of examples is hereinafter given.

EXAMPLES

The present invention is illustrated in a number of aspects by the following examples, all of which have been carried out basically as described in connection with Example 1.

In Example 1, a mixed olefin feed was used in the alkylation of benzene, using a catalyst prepared as follows: 24 g (0.31 mol) of benzene, 2 g (0.02 mole) of CuCl, and 1.3 g (0.01 mole) of aluminum chloride were admixed and weighed out in a dry box under a nitrogen atmosphere and stood overnight in the box at ambient temperature (about 25° C.).

After standing overnight, the catalyst-benzene mixture was weighed out into a reaction flask, stoppered, and then removed from the dry box and heated to strong reflux; to this was added slowly from a dropping tube a mixture of 24 g (0.31 mole) of benzene and 24 g (0.10 mole) of mixed branched chain $C_{16}$ olefins. These olefins were prepared by dehydration of the tertiary alcohol made by coupling 1-chloro tetradecane Grignard reagent with acetone and are believed to be mainly of the following structures:

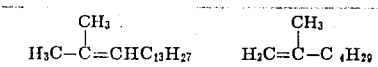

Boiling with reflux was maintained with stirring. Samples were taken at 15 minute intervals as soon as the addition was complete. The first 15-minute sample contained 97.1 percent alkylated aromatics and only 2.9 percent unreacted olefins. There was no apparent improvement in yield after 1 hour, illustrating that the reaction was virtually complete in less than 15 minutes. The recovered, washed and stripped product was 15.2 g. (Emulsion problems in washing caused the loss of considerable product.) This crude product was distilled on the spinning band to give 4.1 g of high purity heart cut and 5.9 g of bottoms. These are believed to be tertiary monoalkyl and tertiary dialkyl derivatives, respectively.

The reactions taking place appeared to be principally:

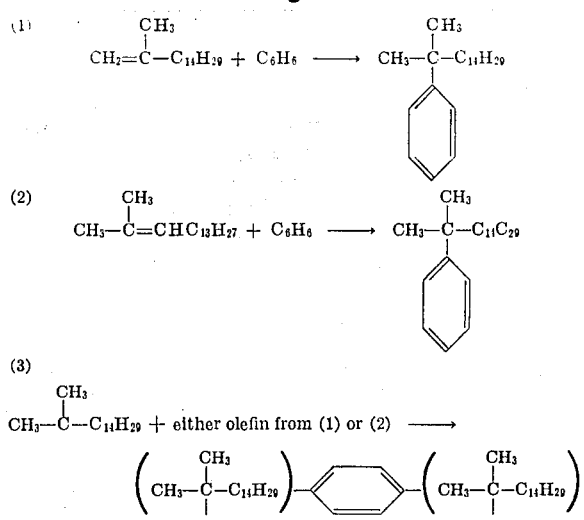

Analysis of the mono-alkyl benzene fraction (heart cut) by Nuclear Magnetic Resonance (100 Megahertz) indicated it to be essentially 100 percent tertiary (no visible benzylic hydrogen).

Careful measurement showed the product to be mixture of three closely related tertiary mono-alkylbenzene isomers, as follows:

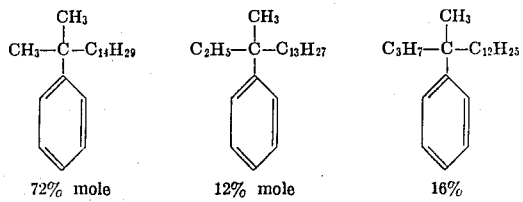

72% mole      12% mole      16%

Although, as might be expected, some isomerization of the alkyl group took place during alkylation, quite remarkably, the catalyst was so selective for tertiary alkylation that even the isomers remained tertiary. This was quite unexpected and shows one of the excellent and unusual advantages of the catalyst.

Example 1 illustrates the effectiveness of the present invention as a selective catalyst for the alkylation reaction.

Table I, below, provides data from six other examples which were carried out in essentially the same manner as Example 1.

Note that Example 2 provides another base case showing 98 percent conversion and no benzylic hydrogen in the product. Example 3 shows that the benzylic hydrogens increase to 29 percent if the catalyst is used hot and without a change to stand after it has been mixed. Example 4 shows that a lower ratio of aluminum chloride to cuprous chloride (0.4) is satisfactory, while Example 5 shows that a higher ratio is not satisfactory (0.77). Therefore, the molar ratio of aluminum chloride to cuprous chloride should not exceed 0.5.

Example 6 shows that the presence of ferric chloride is deleterious, with only 8 percent conversion being obtained. Example 7 shows that the present catalyst system, quickly made, can be used with tertiary alkyl chlorides rather than Type III olefins as the alkylating agent, but that the product contains about 19 percent benzylic hydrogen. It is believed that, if allowed sufficient time to complex as in Example 1, the catalyst would produce a product even lower in benzylic hydrogen.

TABLE I

| | Example Number | | | | | |
|---|---|---|---|---|---|---|
| | 2 | 3 | 4 | 5 | 6 | 7 |
| Olefin feed | 1-1-14 | Mixed [5] | 3-1-14 | Mixed [6] | 9-1-10 FeCl₃ 0.012 | 3-1-14 Cl |
| Catalyst system: | | | | | | |
|   Benzene, moles | 0.31 | 2.7 | 0.90 | 4.01 | 0.90 | 1.80 |
|   AlCl₃ moles | 0.01 | 0.036 | 0.012 | 0.04 | 0.006 | 0.024 |
|   CuCl-moles | 0.02 | 0.072 | 0.028 | 0.052 | 0.012 | 0.048 |
| Catalyst preparation | (1) | (2) | (1) | (1) | (1) | (4) |
| Ratios, molar: | | | | | | |
|   Arom/alkyl | 6.2 | 15.0 | 15.0 | 7.3 | 15.0 | 15.0 |
|   Catalyst/alkyl | 0.1 | 0.1 | 0.1 | 0.047 | (7) | 0.1 |
| Alkylation conditions: | | | | | | |
|   Temp. °C | 80 | 80 | 80 | 80 | 10-18 | 10-15 |
|   Press., mm. Hg | 760 | 760 | 760 | 760 | 760 | 75 |
|   Addn. time, hrs | 0.33 | 0.6 | 0.5 | 1.0 | Rapid | 0.3 |
|   Holding time, hrs | 1.00 | 0.7 | 0.5 | | 1.0 | 0.3 |
| Conversion mole, percent | 98 | 97.6 | >98.5 | 82.9 | 8 | 81.2 |
| Benzylic H, max. mole, percent | None | 29 | No data | 71 | Trace | 19 |
| AlCl₃/CuCl, mol ratio | 0.5 | 0.5 | 0.4 | 0.77 | 0.5 | 0.5 |
| Comments | (8) | (9) | (10) | (11) | (12) | (13) |

[1] Mixed cold and stood 16 hours.
[2] Mixed cold, refluxed 40 minutes and used hot.
[3] Mixed cold, stood 3 days before using.
[4] Mixed cold, brought to boiling point, cooled to 10° C. and used.
[5] 1-1-14/2-1-14/3-1-14 equimolar mixture.
[6] Pilot plant dimers, mixture of C₁₆, C₁₈ and C₂₀ olefins.
[7] FeCl₃:0.1, 0.1 (others).
[8] Base case-high conv., high selec. to t-alkyl.
[9] Note 2 29% nontertiary subst. Shows need for holding time to allow complexing.
[10] Shows that lower AlCl₃/CuCl ratio is O.K.
[11] Shows that higher AlCl₃ is not good.
[12] Note low conversion. Shows presence of FeCl₃ is deleterious.
[53] Note 19% benzylic hydrogen. Shows need for holding time to allow completing of catalysts.

Having disclosed my invention, what is to be covered by Letters Patent is to be determined by the following claims.

I claim:

1. A process for selectively producing tertiary-alkyl aromatic hydrocarbons which comprises: reacting $AlCl_3$ and $CuCl$ in an excess of an aromatic hydrocarbon to obtain a soluble complex preformed catalyst product, the $AlCl_3/CuCl$ mole ratio being from about 0.4 to about 0.5, thereafter, contacting an aromatic hydrocarbon feedstock with an alkylation agent chosen from the group consisting of t-alkyl chlorides and Type III olefins, under alkylation conditions and in contact with said preformed complex in solution in the hydrocarbon phase.

2. A process in accordance with claim 1 wherein the catalyst is prepared by admixing the reactants at substantially ambient temperature and allowed to stand, without external heating and under an inert atmosphere, for a time period from about 8 to about 24 hours.

3. A process in accordance with claim 2 wherein benzene is the aromatic hydrocarbon used in preparation of the catalyst and is also the aromatic hydrocarbon to be tertiary-alkylated, and the $AlCl_3/CuCl$ molar ratio is about 0.5.

4. A process in accordance with claim 1 wherein the catalyst is prepared by refluxing the reactants under substantially atmospheric pressure for a time period from about 5 minutes to about 3 hours.

5. A process in accordance with claim 4 wherein benzene is the aromatic hydrocarbon used in preparation of the catalyst and is also the aromatic hydrocarbon to be tertiary-alkylated, the $AlCl_3/CuCl$ mole ratio is about 0.5, and the reflux period is from about 30 minutes to about 1 hour.

6. A process in accordance with claim 1 wherein the alkylating agent is a Type III olefin and the alkylation conditions include:

a temperature from about 160° F. to about 200° F.,
a pressure which is substantially atmospheric,
an olefin residence time from about 5 minutes to about 2 hours and
an olefin-to-catalyst mole ratio from about 3 to about 15, based on $AlCl_3 \cdot (CuCl)_2$.

7. A process in accordance with claim 6 wherein the temperature is from about 170° F. to about 190° F., the pressure is from about 14.5 psia to about 15.0 psia, the olefin residence time is from about 15 minutes to about 45 minutes, and the olefin-to-catalyst mole ratio is about 10.

8. A process in accordance with claim 1 wherein the alkylating agent is a tertiary alkyl chloride and the alkylation conditions include:

a temperature from about −4° F. to about 212° F.,
a pressure from about 5 mm Hg absolute to about 400 mm Hg absolute,
a t-alkyl chloride residence time from about 2 min. to about 8 hours, and
a t-alkyl chloride-to-catalyst mole ratio from about 3 to about 15, based on $AlCl_3 \cdot (CuCl)_2$.

9. A process in accordance with claim 8 wherein the temperature is from about 32° F. to about 86° F., the pressure is from about 15 mm Hg absolute to about 300 mm Hg absolute, the t-alkyl chloride residence time is from about 15 minutes to about 4 hours, and the t-alkyl chloride-to-catalyst mole ratio is about 10.

10. A process in accordance with claim 7 wherein benzene is the aromatic hydrocarbon used in preparation of the catalyst and is also the aromatic hydrocarbon to be tertiary-alkylated, the olefin contains from 12 to 32 carbon atoms, and the $AlCl_3/CuCl$ ratio is about 0.5.

11. A process in accordance with claim 9 wherein benzene is the aromatic hydrocarbon used in preparation of the catalyst and is also the aromatic hydrocarbon to be tertiary-alkylated, the t-alkyl chloride contains from 12 to 32 carbon atoms, and the $AlCl_3/CuCl$ ratio is about 0.5.

* * * * *